J. S. Coryn.
Butter Mold.
N° 97,053.  Patented Nov. 23, 1869.
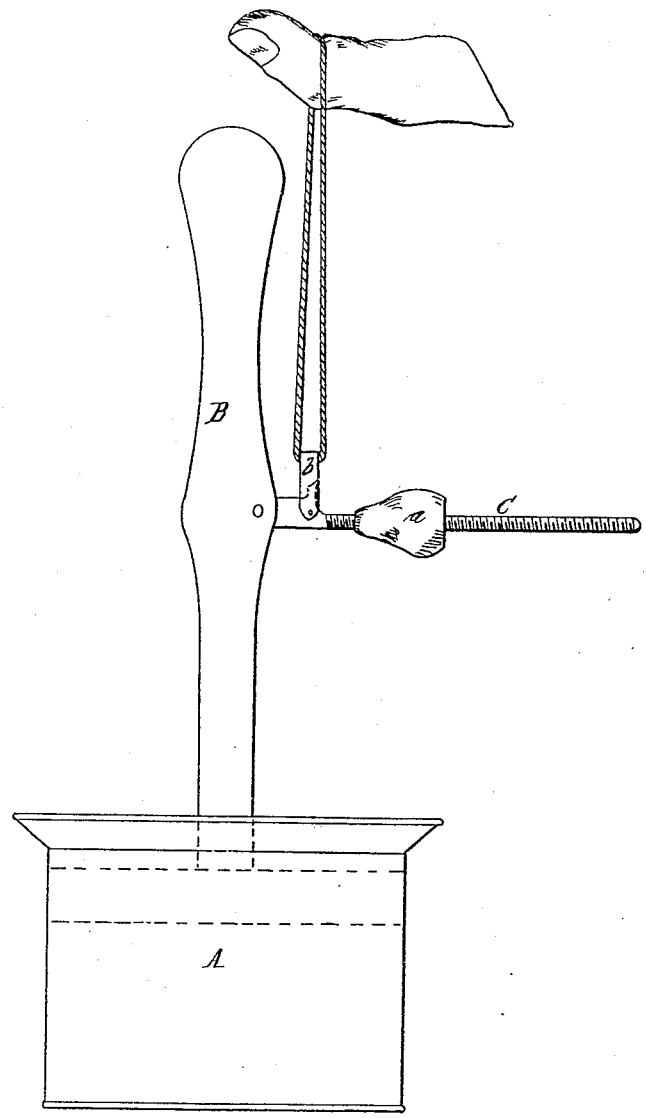
Witnesses:
Henry Thomas
Lewis M. Long
Inventor:
James S. Coryn,
by his Attorneys
A. M. Comach & Bro.

United States Patent Office.

JAMES S. CORYA, OF DUPONT, INDIANA.

Letters Patent No. 97,053, dated November 23, 1869.

IMPROVEMENT IN BUTTER-MOULD AND PRINT.

The Schedule referred to in these Letters Patent and making part of the same.

*To all whom it may concern:*

Be it known that I, JAMES S. CORYA, of Dupont, in the county of Jefferson, and State of Indiana, have invented an Improved Machine for Moulding, Printing, and Weighing Butter; and I do hereby declare that the following is a full and exact description of the same, reference being had to the accompanying drawing, making part of this specification.

This invention consists of a combination of the different apparatus requisite for accomplishing the objects named in the title, to form a compact and complete machine in itself, so that the butter may be accurately weighed at the same time that it is moulded and pressed, without removing it from the mould for that purpose, or using a separate weighing-apparatus.

Let A represent the ordinary matrix of a butter-mould, and B, a handle attached to a follower fitting snugly therein, engraved with any appropriate design or device.

About midway up the handle is pivoted a steelyard-bar, C, which is threaded and flattened for graduation-marks on the upper side, and traversed by a pea, *a*. The bar is provided with a loop, *b*, and a cord for suspension in weighing.

The manner of using this implement is as follows:

The matrix or mould A, being open at the bottom, is placed upon a plate or other clean surface, and the butter put in at the top. The follower or print is then pressed down upon it by the hand. The friction of the follower will be sufficient to allow of the whole being lifted by means of the string attached to the bar C.

The weighing is accomplished by running the pea out on the bar until the butter is balanced, and reading the graduations on the upper flattened side of the bar. The graduations ought preferably to be so arranged as to compensate for the weight of the apparatus, or, in other words, to be in balance when the pea stands at zero. Should the quantity of butter be too small, more may be applied at the bottom, or, if too much, may be removed in like manner.

Having thus described my invention,

What I claim as new, and desire to secure by Letters Patent, is—

The combination herein shown, of the follower B, mould A, steelyard-bar C, and loop *b*, when combined and arranged in the manner substantially as shown, for the purposes set forth.

The above specification signed by me, this 1st day of June, 1869.

JAMES S. CORYA.

Witnesses:
HENRY CONNETT, Sr.,
A. M. CONNETT.